United States Patent
Haartsen

(10) Patent No.: US 6,351,643 B1
(45) Date of Patent: Feb. 26, 2002

(54) METHOD AND SYSTEM FOR AUTONOMOUSLY ALLOCATING A FREQUENCY HOPPING TRAFFIC CHANNEL IN A PRIVATE RADIO SYSTEM

(75) Inventor: Jacobus C. Haartsen, Staffanstorp (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/369,976

(22) Filed: Jul. 16, 1999

Related U.S. Application Data

(63) Continuation-in-part of application No. 08/704,846, filed on Aug. 28, 1996, now Pat. No. 5,884,145.

(51) Int. Cl.[7] .............................. H04Q 7/20; H04B 1/10
(52) U.S. Cl. .......................... 455/450; 455/444; 455/63
(58) Field of Search ................................. 455/450, 444, 455/451, 452, 464, 509, 513, 62, 63; 370/329, 330, 333

(56) References Cited

U.S. PATENT DOCUMENTS

| | | | |
|---|---|---|---|
| 5,109,528 A | 4/1992 | Uddenfeldt | 455/33.2 |
| 5,193,101 A | 3/1993 | McDonald et al. | 455/33.4 |
| 5,197,093 A | 3/1993 | Knuth et al. | 379/61 |
| 5,203,012 A | 4/1993 | Patsiokas et al. | 455/34.1 |
| 5,212,805 A | 5/1993 | Comroe et al. | 455/33.1 |
| 5,247,701 A | 9/1993 | Comroe et al. | 455/33.1 |
| 5,301,188 A | 4/1994 | Kotzin et al. | 370/50 |
| 5,375,123 A | * 12/1994 | Andesson et al. | 370/333 |
| 5,402,523 A | 3/1995 | Berg | 455/33.4 |
| 5,428,668 A | 6/1995 | Dent et al. | 379/59 |
| 5,448,750 A | 9/1995 | Eriksson et al. | 455/33.1 |
| 5,448,754 A | 9/1995 | Ho et al. | 455/34.1 |
| 5,455,821 A | 10/1995 | Schaeffer et al. | |
| 5,497,505 A | 3/1996 | Koohgoli et al. | 455/34.1 |
| 5,507,034 A | 4/1996 | Bodin et al. | 455/34.1 |
| 5,524,280 A | 6/1996 | Douthitt et al. | 455/62 |
| 5,526,402 A | 6/1996 | Dent et al. | 379/59 |
| 5,535,259 A | 7/1996 | Dent et al. | 379/59 |
| 5,537,434 A | 7/1996 | Persson et al. | 375/202 |
| 5,539,730 A | 7/1996 | Dent | |
| 5,548,807 A | 8/1996 | Ueda | 455/33.1 |
| 5,559,866 A | 9/1996 | O'Neill | 455/33.3 |
| 5,570,352 A | 10/1996 | Pöyhonenö | 370/18 |
| 5,581,548 A | 12/1996 | Ugland et al. | 370/330 |
| 5,594,720 A | 1/1997 | Papadopoulos et al. | 370/337 |
| 5,594,949 A | 1/1997 | Andersson et al. | 455/62 |
| 5,603,085 A | 2/1997 | Shedlo | 455/33.1 |
| 6,009,332 A | * 12/1999 | Haartsen | 455/450 |

FOREIGN PATENT DOCUMENTS

| | | |
|---|---|---|
| GB | 2 269 298 A | 7/1992 |
| WO | WO 92/04796 | 7/1991 |
| WO | WO 96/31075 | 6/1995 |
| WO | WO 96/02979 | 7/1995 |
| WO | WO 97/07647 | 8/1996 |

OTHER PUBLICATIONS

M. Almgren, et al. Adaptive Channel Allocation in TACS, Ericsson Radio Systems AB, Pub. Date; Nov. 14, 1995, IEEE, 1995, pp. 1517–1521.

* cited by examiner

Primary Examiner—Vivian Chang
Assistant Examiner—Charles N. Appiah
(74) Attorney, Agent, or Firm—Jenkens & Gilchrist PC

(57) ABSTRACT

An allocation method and system for allocating a least-interfered communications link between a cellular mobile station and a private radio base station within a cellular system is disclosed. A set of candidate carrier frequencies are first selected and ordered by the amount of interference present within the cellular system, and a subset thereof selected. A second set of candidate frequencies and associated timeslots are then selected from the subset and ordered by the amount of interference present in the private radio system environment, and a second subset thereof selected. A plurality of discrete hop lists for each timeslot are then formed, and one of the hop lists exhibiting the least amount of interference is then selected to be applied in the communications link.

29 Claims, 6 Drawing Sheets

METHOD AND SYSTEM FOR AUTONOMOUSLY ALLOCATING A FREQUENCY HOPPING TRAFFIC CHANNEL IN A PRIVATE RADIO SYSTEM

RELATED APPLICATION

The present invention is a continuation-in-part of applicant's and assignee's U.S. patent application Ser. No. 08/704,846, now U.S. Pat. No. 5,884,145 entitled "Method and System For Autonomously Allocating a Cellular Communications Channel For Communication Between a Cellular Terminal and Telephone Base Station", filed Aug. 28, 1996.

BACKGROUND OF THE INVENTION

1. Field of the Invention

The present invention relates generally to private radio communication systems, which typically cover local indoor residential or business areas. Particularly, the present invention relates to radio communication systems which employ an air-interface compatible to an existing cellular digital Time-Division Multiple Access (TDMA) standard like the Global System for Mobile Communication (GSM) or the Digital Advanced Mobile Telephone Service (D-AMPS). More particularly, the present invention relates to automatic frequency allocation in such private radio systems to avoid interference with a cellular network sharing the same frequencies, and methods and communication systems to effectuate the same.

2. Background and Objects of the Invention

The past decades have seen a considerable rise in the deployment of mobile telephony. After the slow start of analog standards like AMPS, Nordic Mobile Telephone (NMT) and the Total Access Communication System (TACS), mobile telephony has recently become quite popular in the consumer markets with products employing advanced digital standards like GSM and D-AMPS. In addition to other developments in mobile phone features, like smaller size and longer battery life, much progress has been made at the network side as well, particularly, in frequency reuse schemes to avoid co-channel interference between adjacent cells. Increasingly, dense cell reuse plans have been complemented with hierarchical cell structures, where macrocells cover entire districts, microcells cover smaller parts like streets, and picocells cover very small areas the size of a few rooms. Important for the hierarchical cell structure is that all the base stations deployed (ranging from macro to pico base stations) are part of the same public land mobile network (PLMN).

In order to avoid co-channel interference between different radio links, a structured channel allocation scheme is applied. Within a cell, the cellular base station makes sure that connections to different mobile stations are carried over different carrier frequencies and/or different timeslots. In order to suppress co-channel interference from surrounding cells, a frequency reuse scheme is applied in which the cellular operator plans the frequencies such that adjacent cells do not use the same frequency set. For example, in conventional AMPS systems, a 7-site/21-sector reuse methodology (7/21) is applied, which means that in a cluster of 21 sectors, all of the applied frequencies therein are unique. In modern cellular digital systems, however, more dense reuse schemes are applied, like a 4/12 or even a 3/9. In more advanced cellular systems, slow frequency hopping (FH) traffic channels have been introduced. For example, in GSM, the traffic channel is allocated a fixed slot, but in each transmission frame a different carrier frequency corresponding to a particular hopping sequence is used. Traffic channels belonging to a single base station use orthogonal hopping sequences. This means that there is never a collision between connections controlled by the same base. However, between different base stations, random hopping may be applied and collisions may occur.

Recently, private networks for residential and business areas have been developed, which although using the same air-interface and the same spectrum as the cellular system, are not integrated with the overlaying public cellular network. In this sense, these private systems cannot be considered as micro or pico networks since there is no direct communication between these private systems and the cellular system. For example, for residential usage, private base stations can be used as described in either U.S. Pat. Nos. 5,428,668 or 5,526,402 which only connect to a Public Switching Telephone Network (PSTN).

If, however, such a private radio communication system is placed into an area covered by the cellular system with which the private system has to share frequencies, a problem arises since the private base stations are not coordinated with the cellular network. Therefore, they are not incorporated into the frequency reuse plan of the cellular network. Moreover, they are not coordinated among themselves. Accordingly, a method is needed which both prevents the private radio system from interfering with the overlaying cellular system, and which also prevents interference among different private radio systems covering the same area.

A recent patent application of the assignee, of which the present inventor is a co-inventor, entitled "Methods and Systems for Allocating a Cellular Communications Channel for Communication between a Cellular Terminal and a Telephone Base Station Using Received Signal Strength Measurements," Ser. No. 08/517,710, filed Aug. 21, 1995, describes a method in which downlink measurements on control channels performed within the mobile station are sent to a cellular-operator-controlled server in the fixed network, which subsequently allocates to the private telephone base station a set of traffic channels corresponding to the control channel with the lowest received signal strength. This method, however, requires a correlation between the cellular traffic channels and the cellular control channels, a correlation function which must be present in the database of the server. In addition, replanning a cellular network again requires the interaction of the operator's server.

A more autonomous method was described in the aforementioned U.S. patent application Ser. No. 08/704,846, entitled "Method and System for Autonomously Allocating a Cellular Communications between a Cellular Terminal and a Telephone Base Station", in which a combination of a slow adaptive frequency allocation and a fast-responding dynamic channel selection was described. First, a set of frequencies was derived that minimally interfered with the cellular system. Then from this set the best channel at that point in time was selected where a "channel" was a frequency and a timeslot.

Another technique used to facilitate the co-existence of uncoordinated systems in a particular area is frequency hopping, a general technique which spreads the interference among a number of users. Because the aforementioned private systems are neither coordinated with each other nor with an overlapping cellular system, only random FH may be applied. Sporadic collisions are overcome by the combination of frame interleaving and Frequency Error Correction (FEC), as is understood in the art. However, if the number of collisions increases, the system breaks down since the interleaving and FEC can only cope with a small amount of errors, i.e., a low collision rate.

To provide a low collision rate in random FH systems, either the number of frequencies to hop over must be large or the traffic load on the frequencies must be small. Both conditions are hard to fulfill in private base stations sharing the frequency spectrum with an overlapping cellular system. First, due to hardware limitations, current cellular terminals can only hop over frequencies and not over timeslots within a transmission frame. Further, in order to avoid interference to the cellular system (especially if there is a high density of private base stations) the private radio systems should not use the carrier frequencies that are presently in use by nearby cellular base stations. This leaves the number of carrier frequencies to hop over in the private radio system rather limited, with rather great danger for interference (collisions) between different private radio systems which are not coordinated but which may still have considerable overlapping coverage areas. However, FH in uncoordinated systems is nonetheless advantageous because FH in general provides interference spreading and also reduces interference to unknown or unexpected users sharing the same spectrum. In addition, FH combats multipath fading provided the frequencies to hop over span a sufficiently wide spectrum, as is understood in the art.

It is therefore an object of the present invention to provide a method and system in which carrier allocation occurs in the private base station automatically to avoid interference situations.

It is a further object of the present invention that the method and system be adaptive, in that if the cellular network is replanned, the private network will automatically replan as well in order to avoid interference conditions.

It is also an object of the present invention that the method and system respond automatically upon encountering interference from other nearby private base stations and provide interference spreading among any users sharing one or more of the frequencies.

It is another object of the present invention to provide a method and system which allow a private radio system within a larger cellular network to autonomously determine those frequencies and frequency/timeslot combinations it can use with minimal disturbance to and from the overlaying cellular system.

It is still another object of the present invention that the method and system in the private radio communication system automatically select a frequency/timeslot hop set that prevents interference with the overlaying cellular system as well as preventing interference with other, nearby private radio systems.

SUMMARY OF THE INVENTION

The present invention advantageously provides a method and communication system in which a private radio communication system which shares frequencies with the overlaying cellular system automatically selects frequencies that minimize interference with this overlaying cellular system. In addition, the method and communication system minimizes interference with other, nearby private radio communication systems also sharing the frequencies. The method uses downlink and uplink received signal strength measurements on allowed carriers of the cellular and private communications systems. The signal strength measurements are carried out by the private base station or by the mobile station when in idle and traffic modes. The results of the measurements done in the mobile station are then transferred to the private base station where a procedure is carried out to determine the best available frequency or frequency/slot combination to use.

The method in the communication system of the present invention is preferably divided into three steps. The first step is the Adaptive Frequency Allocation (AFA) procedure as set forth in the aforedescribed U.S. patent application Ser. No. 08/704,846, which determines an initial set of eligible frequencies. Each frequency in this initial set can be used in a communication link in the private radio communications with minimal disturbance to communications within the overlaying cellular system. The selection of this initial set is based on long-time averaging over many measurements carried out in the private base station or in a mobile station in communication therewith during idle mode. If a digital communication system is used based on a Frequency Division Multiple Access/TDMA or FDMA/TDMA, this initial set will only provide the carrier frequencies to use.

The second step is a Dynamic Hop set Selection (DHS) method similar to the Dynamic Channel Selection (DCS) method set forth in the aforementioned U.S. patent application Ser. No. 08/704,846. The DHS is a fast adaptation method that responds to instantaneous interference measured just before the connection establishment and during the connection, and dynamically makes a list of channels (both frequency and timeslot) based on the instantaneous interference experienced. From this list, a number of discrete hop lists can be derived in the third step of the present invention by grouping the channels with the same timeslot. Each hop list can now be used by the private system as a set to frequency hop over. For example, if the system is based on GSM, out of 8 different hop lists (one hop list for each timeslot) one hop list can be chosen. By using such a hop list, the system hops over frequencies which are neither used by overlapping cellular systems nor by adjacent or overlapping private systems, yet the same timeslot is used.

The combination of the long-term AFA algorithm and the short-term DHS algorithm provides an improved method to prevent interference not only between the private radio network and the cellular network, but also to prevent interference between two adjacent or overlapping private radio networks sharing the same spectrum. Whereas the AFA algorithm adapts automatically to changes in the cellular network, the DHS algorithm adapts automatically to changes in the private radio environment. Finally, a frequency hop list is selected which provides additional interference spreading and protection against multipath fading.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENT INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
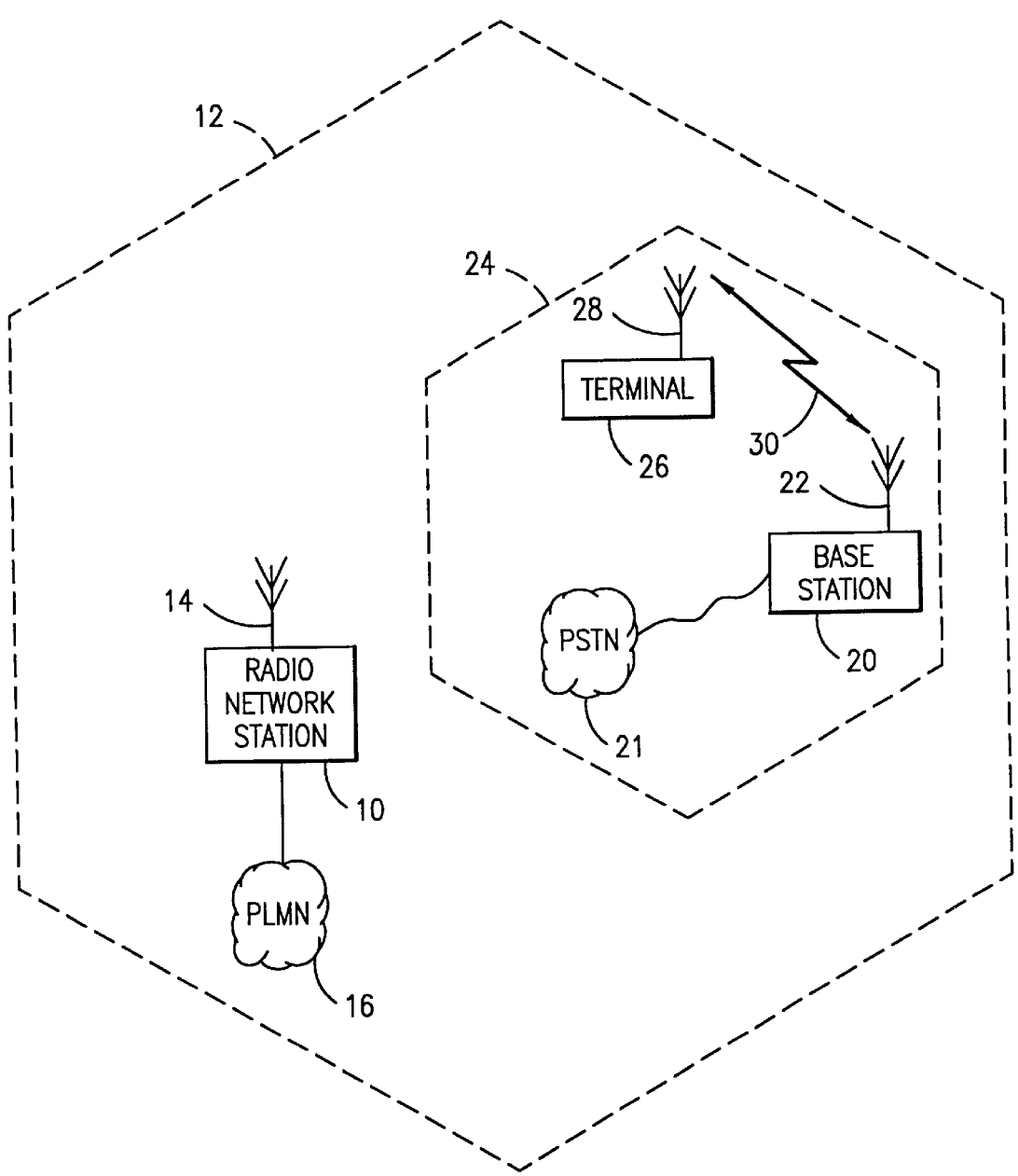
FIG. 1 is a schematic illustration of a private radio communication system within a cell of a cellular network, the private radio system including a base station and a cellular terminal, with radio communications between the terminal and the base station.
Figure 2:
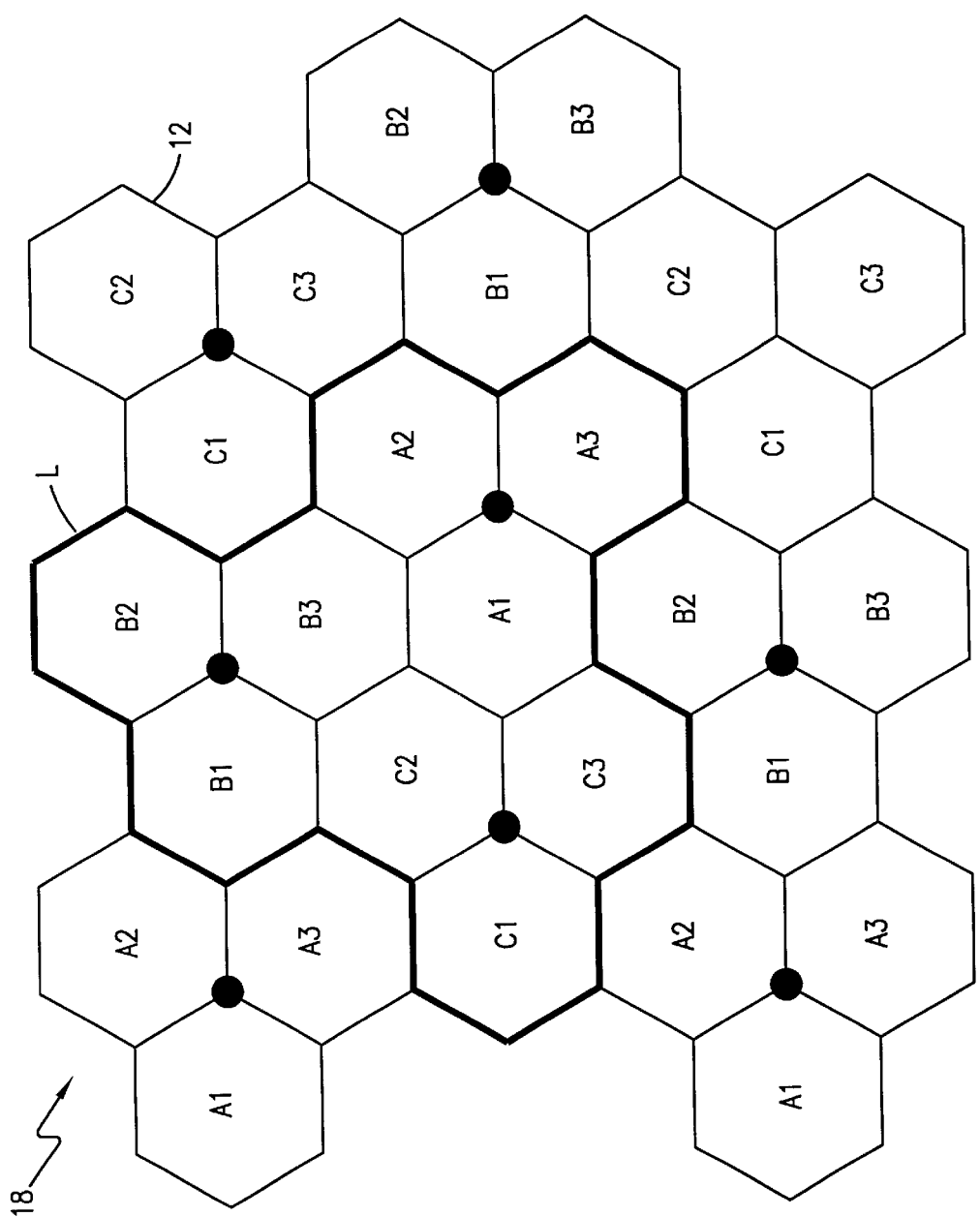
FIG. 2 is a schematic illustration of a 3/9 reuse pattern for a wide area cellular network.

Referring now to FIG. 1, a conceptual diagram of a private radio communications system according to the present invention is shown. Such a system operates within a cellular communications network which allocates portions of a plurality of frequencies within a spectrum to separate geographic cells. Thus, the network encompasses a wide area wireless communications network having the capacity to provide high quality wireless communications to a large number of users with a limited number of frequencies allocated to the wide area cellular network. As shown in FIG. 1, a wide area cellular network includes at least one radio network cell station 10, such as a cellular telephone cell station, for transmitting and receiving messages in a network cell range indicated by 12, via cell antenna 14. The range 12 of radio network cell station 10 is typically represented graphically as a hexagon, as illustrated in FIGS. 1 and 2. Radio network cell station 10 also interfaces with a Public Land Mobile Network (PLMN) 16 in a manner well understood to those skilled in the art.

It will also be understood by those having skill in the art that a wide area cellular network 18 typically includes many radio network cell stations 10 to cover a large area, as illustrated in FIG. 2. In such a system, each radio network cell station 10 covers a cell (range) 12 within the wide area cellular network 18 and may interface with Base Station Controllers (BSCs, not shown) and Mobile Switching Centers (MSCs, not shown). The MSC may provide the connection to the PLMN 16 for all of the network cell stations 10 that make up the wide area cellular network 18.

With further reference to FIG. 1, one or more private or personal telephone base stations 20 are located within the cell (range) 12 of the network cell station 10 of the wide area cellular system or network 18. Base station 20 includes a low power transceiver for transmitting and receiving signals via base station antenna 22, over a limited base station range 24, typically on the order of tens of meters. Thus, a base station may be used for transmission and receipt of private radio communications in a home or office. Base station 20 is electrically connected to a wire network 21, such as the Public Switched Telephone Network (PSTN). PSTN 21 is the regular "wire line" telephone system supplied by, for example, the regional Bell Operating Companies, and may use copper wire, optical fiber or other stationary transmission channels. Base station 20 may be wired directly to the PSTN 21 or connected to a Public Access Branch Exchange or PABX (not shown).

Still referring to FIG. 1, a mobile terminal 26 is shown for radio communications with both base station 20 and radio network cell station 10 via an antenna 28 using basically the same air-interface and the same spectrum. Terminal 26 includes a radio telephone such as a cellular phone. Terminal 26 may also include, for example, a full computer keyboard and display, a scanner, and have full graphics and multimedia capabilities. As illustrated in FIG. 1, when terminal 26 is in the range 24 of the base station 20, terminal 26 attaches to base station 20 and a radio link 30 may be established.

It will be understood by those having skill in the art that a complete private radio communications system, referenced herein for convenience by the numeral 24, will typically include a private base station 20 and a plurality of terminals 26, where a multiplicity of other private base stations may co-exist with and may form a private network with the private base station 20 within cell 12, as shown in FIG. 1. It will also be understood by those having skill in the art that conventional communications and handoff protocols may be used with the present invention, and need not be described further herein.

As discussed, today's wide area cellular networks, such as network 18 in FIG. 2, utilize cell reuse methodologies in order to reduce co-channel interference. Cell reuse guarantees that a particular communications pathway, e.g., a particular frequency, used in one cell, such as cell (range) 12, is not reused in a cell nearby but only in cells at a sufficient distance away to avoid interference problems. In particular, the interfering signals experience a propagation loss sufficiently large such that with respect to the received (carrier) level of the desired signal, the resulting carrier-to-interference ratio in the considered cell is high enough for acceptable radio operation. Cell reuse provides the capability to serve many users with only a limited amount of frequency spectrum.

An example of a cellular reuse pattern is illustrated with reference again to FIG. 2, which depicts a 3-site/9-sector reuse plan within the network 18. This means that in a cluster L of nine sectors (indicated by the thick line) containing sectors A1, A2, A3, and B1, B2, B3, and C1, C2, C3, all frequencies are unique. Conventionally, the frequencies start to be reused in a structured manner outside the cluster L. The frequency planning is fixed in most cellular systems, but can be somewhat adaptive in more advanced cellular systems. In the latter case, the system can slowly adapt to changes in the network and can therefore be considered semi-fixed.

As discussed, private or personal communications systems 24, such as those serviced by base station 20, have been described and developed that make use of the same frequency spectrum as the cellular system. In this way, a cellular terminal 26 can access a personal base station 20 without the need for modifications in the radio hardware design. These private base stations 20 provide a direct connection between the cellular terminal 26 and the PSTN 21 without the interaction of an overlaying cellular system or a cellular operator, such as at the radio network station 10. However, this also means that these private base stations 20 are not controlled by the cellular operator and thus are not integrated into the cellular system 18.

It should be understood, therefore, that since there is no coordination between the overlaying cellular system 18 and the private base stations 20 therein, the private systems 24 cannot be part of the overall reuse scheme employed in the cellular system. Consequently, problems of co-channel interference result since the private base stations 20 can use the same frequencies as the cellular system even though not being a part of the cellular reuse plan. In addition, private base stations 20, even though being in close proximity to each other, have no direct communication with each other, which is also a cause for co-channel interference between different and adjacent private radio systems 24.

As discussed in the aforementioned U.S. Pat. Nos. 5,428,668 and 5,526,402 and in U.S. patent application Ser. No. 08/517,710, a private radio system overlaid by a cellular system should not use those frequencies used by the cellular system in the cell (or in adjacent cells) where the private radio system 24 is located. However, unlike a conventional reuse pattern described in connection with FIG. 2 where all frequencies used by the cellular system within the cluster L are unique, frequencies used in the cluster L can be reused by the private system more often, provided that the private system utilizes low power transmissions and a short range.

For example, if a private radio system 24, i.e., base station 20 and terminal 26 in FIG. 1, is located in cell A1, i.e., cell (range) 12, in a cellular system 18 with a 3/9 reuse scheme, as illustrated in FIG. 2, the private radio system 24 should not use those frequencies in cell A1 or in contiguous cells A2, A3, B2, B3, C2 or C3. Rather, those frequencies in the more distant and non-contiguous cells B1 and C1 within cluster L would be used, since those frequencies would produce the least amount of co-channel interference to the private radio system 24. Accordingly, private radio systems 24 located in cell A1 would preferably choose, e.g., via the aforementioned uplink and downlink received signal strength measurements, radio frequencies for reuse from a set of frequencies formed from the set of frequencies used in distant cells B1 and C1. Although the experienced interference from cells B1 and C1 is higher than interference from corresponding A1 cells outside the cluster (which are the normal co-channel cells for cell A1), because of the small distance between the mobile terminal 26 and the private base station 20 and thus higher received carrier power, an acceptable carrier-to-interference ratio can nonetheless be obtained in the private radio system 24. In addition, the low-power signals applied in the private radio system 24 will not compromise the cellular communications in cells B1 and C1.

The present invention is, accordingly, directed to a method, and associated communications system, for obtaining an optimal set of channels to be used by the private radio system 24, where it should be understood the term "channel" used herein refers to a frequency in an FDMA system, and a frequency/timeslot combination in an FDMA/TDMA system. The method obtains the optimal frequency set automatically by using uplink and downlink measurements only. In the event the cellular reuse plan changes (because the cellular system operators reorganize the reuse pattern frequently), the set of frequencies ascertained applicable for the private radio systems 24 by the method of the present invention should automatically adapt accordingly. In this sense, an Adaptive Frequency Allocation (AFA) algorithm is required.

It should be understood that measurements are taken in the downlink and the uplink on all the frequencies the private radio system 24 is allowed to work on. A generic list of allowable frequencies is provided to the private base station 20 either at the time of manufacturing or by a wire or wireless (with the mobile station 26 as a possible intermediary) communication between the cellular operator and the private base station. The communication between the operator and the private base station 20 can be implemented either wireless via the cellular interface, or over the wire via the PSTN 21 interface. In both cases, a service number, e.g., an 800 number will be called that connects the mobile station 26 or the base station 20 to a service center of the operator. The generic list of frequencies can then be downloaded via Short Message Service (SMS) or via a data channel into the mobile terminal 26 or the private base station 20.

This initial, generic list preferably includes all the frequencies the operator is allowed to operate on. Alternatively, the list may be restricted to those frequencies the operator allows the private radio systems 24 to operate on. In any event, the frequencies are preferably expressed in Absolute Radio Frequency Channel Numbers (ARFCN) which uniquely identify the frequencies in the cellular spectrum. An example of a generic list 36 containing candidate ARFCN frequencies is shown in FIG. 3.

Figure 3:
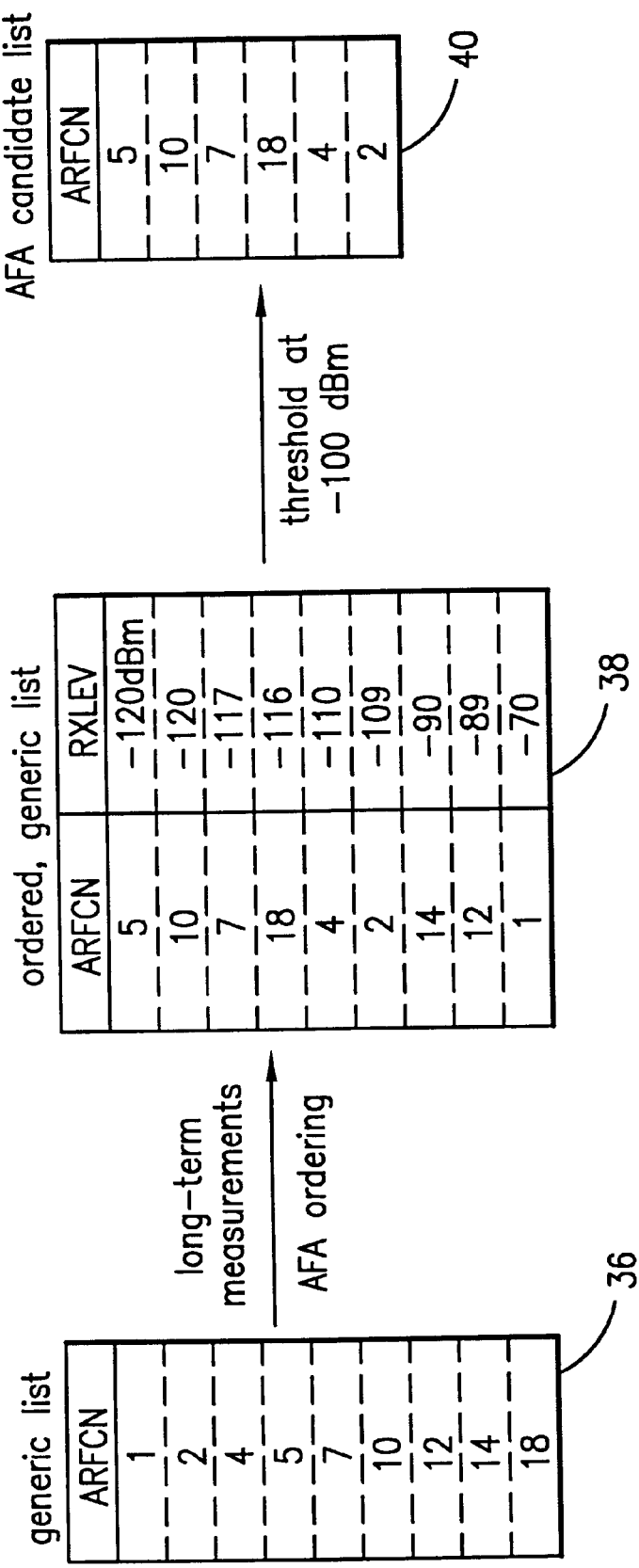
FIG. 3 illustrates a method for ordering candidate reusable frequencies in accordance with an initial ordering scheme of the present invention.

Uplink measurements on frequencies in the generic list 36, as shown in FIG. 3, can be performed directly in the private base station 20. Downlink measurements can either be performed in the private base station 20 or the private base station 20 can order a mobile station, such as the terminal 26, that is attached to the private base station 20, to carry out the downlink measurements and report them to the private base station. The latter is preferable as it is more cost-effective since the base stations 20 usually contain an uplink receiver only; an extra downlink receiver in the private base station 20 for downlink measurements would add extra costs, and measurements can equally well be carried out by the downlink receiver of the mobile terminal 26. From the downlink measurements, the private radio system 24 can identify those particular frequencies that are used for control channels (in the GSM system., for example, the Broadcast Control Channel or BCCH directly indicates which frequencies in the cell and neighboring cells are used for control channels).

After processing the aforedescribed measurement results, the generic frequency list 36 can be ordered so that the least interfered frequency (by ARFCN number) is at the top and the most interfered frequency is at the bottom. An example of a list 38 thusly ordered by signal strength measurements (RXLEV) is also shown in FIG. 3, where the strong signaled carrier frequencies, causing the most interference, are at the bottom, and the weaker signaled carrier frequencies are at the top. As noted, the control channels for the cell 12, as well as for immediately adjacent cells, can be placed on the bottom of the ordered list 38, if they do not already end up there after the re-ordering process, since they are active all the time. In the aforementioned measurement processing, there are a number of issues that can be taken into account to order the list. First, if the uplink and downlink frequencies are coupled, as in current cellular systems (there is a fixed frequency distance between uplink frequency and downlink frequency), then the uplink and downlink measurements should be combined in order to decide the placement of the frequencies in the ordered list 38. In this case, the downlink measurements can be weighted heavier than the uplink measurements since the downlink measurements are more reliable due to the larger cellular antenna height and antenna gain.

Figure 4:
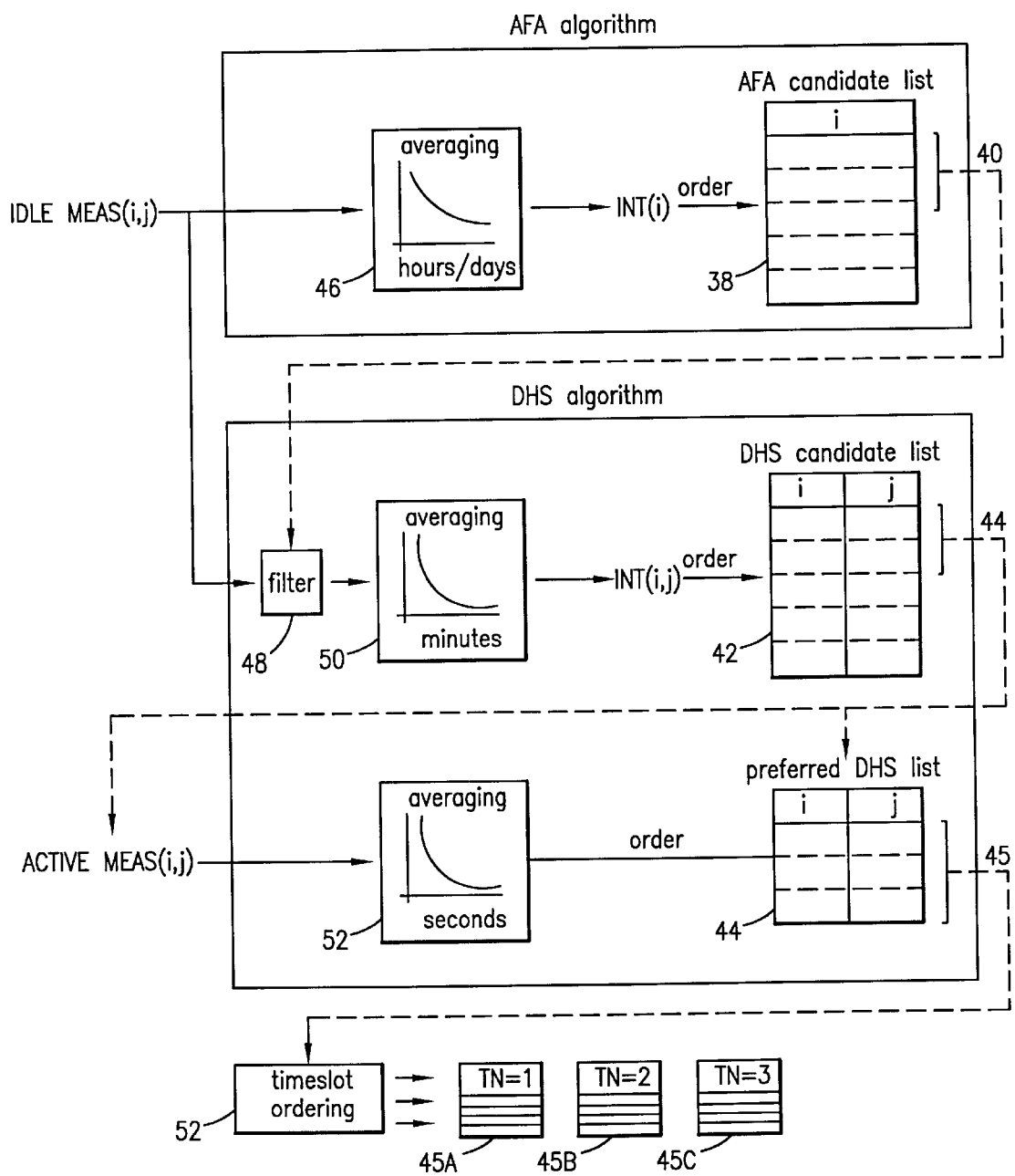
FIG. 4 further illustrates the method for ordering the frequencies as set forth in FIG. 3 and in accordance with a subsequent ordering scheme and a frequency hop selection ordering scheme of the present invention.

Second, the measurements are also advantageously used in an averaging process. For example, the time-of-day during which the measurements were obtained can be taken into account, thereby allowing one to put more weight on measurements performed during times when most cellular activity takes place (for example between 8am and 6pm or during lunch hours). The measurements are then averaged over a long time period (like several hours or days). After the generic list 36 has been so ordered into the "long-term" ordered list 38, a subset with all the available and allowable frequencies listed at the top can be used as a candidate list 40 for channel allocation, as shown in FIGS. 3 and 4. This subset candidate list 40 preferably contains only frequencies which, based on the received signal levels or strengths (RXLEV) as added to the list, are safe to use by the private radio system 24, producing minimal interference to and experiencing minimal interference from the overlaying cellular system. In particular, those frequencies with a measured interference above a predetermined (or variable) threshold are excluded in ascertaining the candidate list 40 frequencies.

The generic list 36, the ordered list 38, and the AFA candidate list 40 generated therefrom are shown in detail in FIG. 3. In this example, the RXLEV threshold of safe usage was set at −100 dBm. In this manner, a preferred candidate frequency may be selected from the top of the candidate list 40, which in FIG. 3 is the frequency with ARFCN number 5.

With reference now to FIG. 4, there is shown a representation of an algorithm or method used in the system of the present invention to generate the aforementioned ordered list 38, AFA candidate list 40 and subsequent lists to be described hereinafter. In particular, FIG. 4 illustrates the first step of the present invention, i.e., the AFA algorithm. As discussed, the private base stations 20, when powered on, continuously perform RSSI measurements on the uplink frequencies within the generic list 36, and also perform downlink measurements (or orders mobile terminals 26 registered to the particular base station 20 to do so). All of these idle measurements, indicated in FIG. 4 as IDLE MEAS (i, j) are averaged (irrespective of any particular timeslot j in the aforementioned "long-term" AFA measurements), generating an average interference result, INT(i), per carrier frequency, where i represents a particular frequency (and j is a timeslot associated therewith). As shown in FIG. 4, the averaging (box 46) is long-term in duration, i.e., over several hours or even days. Furthermore, the averaging process is continuous, irrespective of whether there is a connection or not. From this long-term averaging, the ordered list 38 is formed with the least-interfered carrier frequencies at the top. As discussed, a subset is selected from the top of the list and reserved as the AFA candidate list 40, which constitutes the carrier frequencies the private radio system 24 can use in case a connection must be made.

With the above-described AFA scheme, the problem for private radio systems 24 of interference to and from the cellular network is minimized since a candidate list or set 40 of frequencies is derived that fits in and slowly adapts to the reuse plan of the overlaying cellular system. However, since all private radio systems 24 co-located in a restricted area will experience substantially the same cellular environment, they will all produce a similar list or set 40 of candidate frequencies. Therefore, the above method alone does not preclude the situation where two nearby private radio systems 24 within a cellular system select the same carrier frequency and thus interfere with each other. In order to minimize the potential for this mutual interference between nearby private radio systems 24, a second adaptation procedure, termed "smart" frequency hopping, is required which responds to interference instantaneously. The set of frequencies to hop over is determined in this second step according to the aforementioned Dynamic Hop set Selection (DHS) routine.

Prior to allocating certain carrier frequencies from the aforedescribed candidate set 40, the private radio system 24 performs more elaborate interference measurements on all or a limited number of the candidate carrier frequencies indicated in the set or list 40. For an FDMA/TDMA system, for example, all of the timeslots for a particular carrier frequency are measured and averaged separately. These measurements, however, are averaged over a shorter time period (minutes or seconds). As discussed, the uplink measurements are performed in the private base station 20 and the downlink measurements are either performed in the private base station 20 or the base station orders the mobile station 26 to do interference measurements and give a measurement report. Based on the interference measurement results, the private base station 20 can then decide on the best carrier frequencies or frequency/slot combinations to use, i.e., the least interfered frequencies or frequency/slot combinations, which can then be allocated by the private base station 20 to be used in an FH link.

During the connection, periodic measurements on the received signal strength and the link quality in both the uplink and the downlink inform the private base station 20 of the current interference conditions. If the link quality becomes unacceptable, a handover to another, better FH link can be initiated by the private base station 20. This second adaptation scheme of the present invention, i.e., the DHS scheme, is used dynamically during the entire connection. The DHS scheme minimizes not only interference between private base stations, but will minimize interference to the cellular system as well. The latter results from the fact that the private base station 20 initiates a handover if the interference level becomes too high, irrespective of whether it comes from another private radio system or from the cellular system. Therefore, if the AFA scheme is suboptimal or responds too slowly to a change in the cellular network, the DHS scheme will still guarantee that minimal interference between the private radio system 24 and the cellular system will occur. Indeed, the AFA and DHS schemes not only respond to co-channel interference, but also to adjacent-channel interference. The interference measured can equally well result from spillover from a strong adjacent channel. The adaptive scheme of the present invention will take care of this kind of interference as well.

Figure 5:
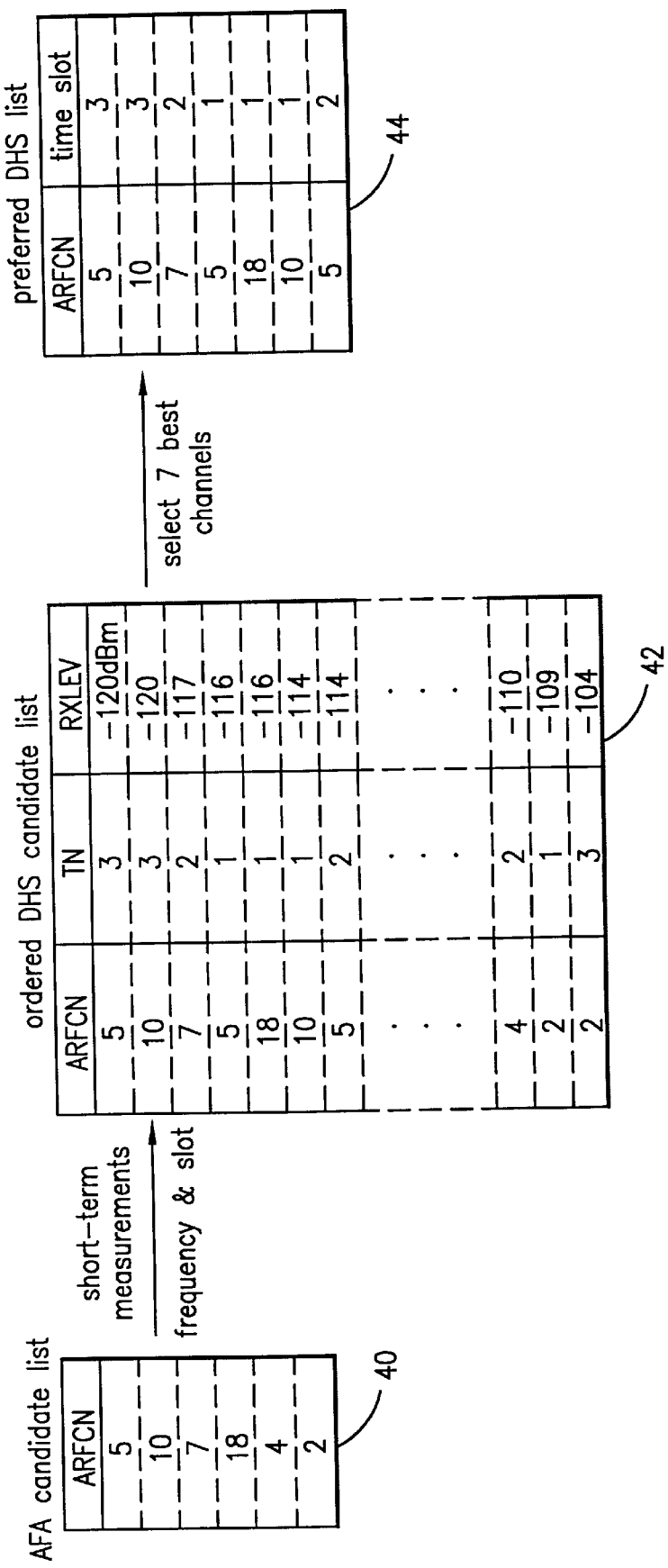
FIG. 5 illustrates a method for the subsequent ordering scheme of FIG. 4, ordering the candidate reusable frequencies described in FIGS. 3 and 4 in accordance with frequency and timeslot.

FIG. 5 illustrates in more detail the aforedescribed DHS procedure assuming a FDMA/TDMA system like GSM or D-AMPS. All channels (frequency/timeslot combination in this example where ARFCN indicates the frequency and TN the timeslot number) are measured. Then the ARFCN/TN list is ordered according to the measured RXLEV to form an ordered DHS candidate list 42. From this ordered list 42, the top N channels (N=7 in the example of FIG. 5) are taken to be used in the DHS traffic (or active) mode, forming a preferred DHS traffic list 44.

Figure 6:
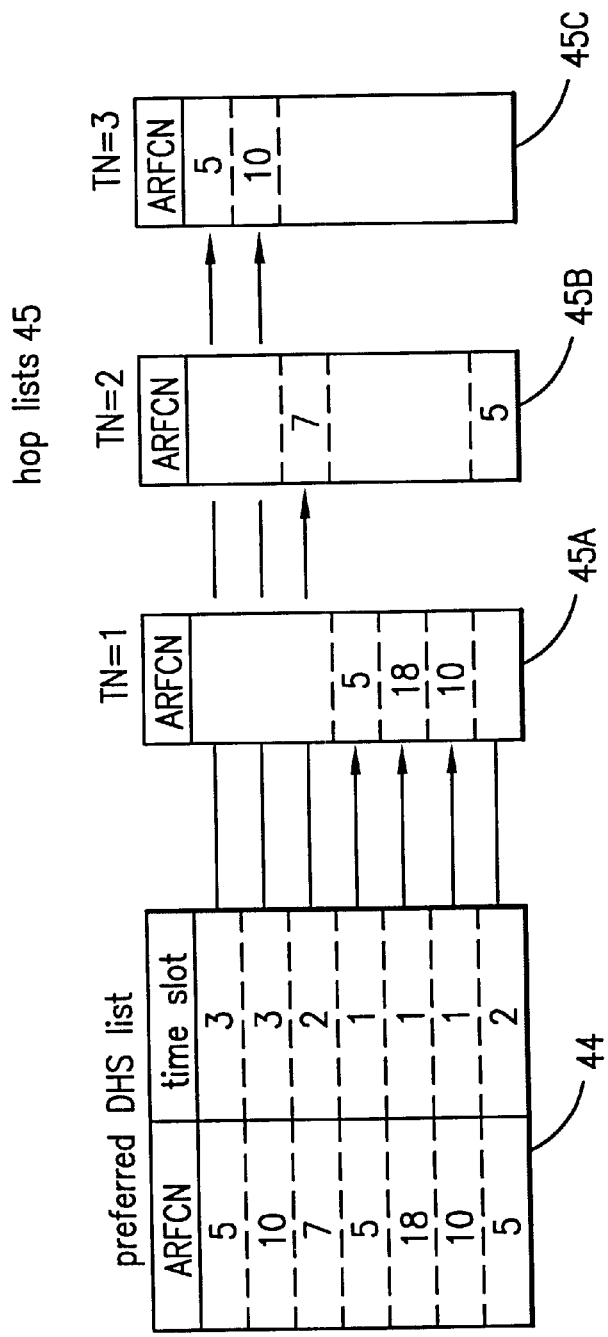
FIG. 6 further illustrates a method for creating and ordering hop lists of the frequencies and time slots of FIGS. 4 and 5 in accordance with a frequency hop selection ordering scheme of the present invention.

This preferred DHS traffic list 44 may be used directly as a hop list when a channel is a frequency such as in an FDMA system. However, in an FDMA/TDMA system, channels using the same timeslot may be grouped, as illustrated (box 45) in FIGS. 4 and 6, into M hop lists where M represents the number of timeslots in a frame (M=3 was used in FIGS. 4 and 6 for simplicity). One of the M hop lists, i.e., list 45A (timeslot TN=1), 45B (TN=2) or 45C (TN=3), may now be selected as the traffic hop list. It should be understood that the channels in the respective hop list, e.g., the channels with frequencies ARFCN=5, 10 and 18 of timeslot TN=1 in list 45A, each use a different frequency but the same timeslot. This mechanism avoids complicated time jumps in a cellular mobile, as is understood by those skilled in the art.

At call setup, a particular hop list, e.g., the aforementioned list 45A, is forwarded from private base station 20 to the pertinent cellular terminal 26. In addition, a hop sequence is provided which indicates in which order the carriers in the hop list are used. The aforementioned hop sequence may, for example, depend upon the identification (ID) number or the serial number of the respective private base station 20 or a seed value, as is understood by those skilled in the art. During the connection, periodic measurements on the received signal strength and link quality (for both the up- and downlinks) inform the private base station 20 of the current interference conditions. If the link quality deteriorates and becomes unacceptable, a handover to a different, better hop list and/or timeslot, e.g., TN=2 in list 45B, may be initiated by the private base station 20. The aforedescribed DHS technique minimizes interference between the private base stations 20 in the area as well as minimizes interference to the overlaying cellular system. The latter benefit results from the fact that the pertinent private base station 20 initiates a handover if the interference level becomes too high, irrespective of whether the interference is from another private radio system 20 or from the cellular system.

With reference again to FIG. 4, the second and third steps of the present invention, i.e., the DHS algorithm and hop list selection techniques, are further illustrated and will now be described in more detail. The AFA candidate list 40 is used in a filter 48 to let pass only those idle measurements, i.e., IDLE MEAS (i, j), which relate to the frequencies as found in the AFA candidate list 38. It should be understood that both the frequency and timeslot (i and j) measurements may also be used by the AFA process, but then all timeslot measurements on the same frequency are averaged together. With reference again to the DHS algorithm, the measurements on the frequencies and the time slots are averaged over a medium time duration, e.g., over a period of minutes (box 50). The average of these interference measurement results, INT(i,j), are then determined. From this medium-term averaging, the ordered DHS list 42 is formed. It should be understood that the ordered DHS list 42 is present whether or not a connection has been established. Furthermore, the list 42 is constantly updated and re-ordered depending on the results of the medium-term averaging (box 50).

If a connection is then established, the top (N) channels from the ordered list 42 are selected to form the preferred traffic list 44. During the connection, active measurements (active mode), i.e., via ACTIVE MEAS(i, j), are performed on these frequency/timeslot pairings alone and they are short-term averaged, i.e., over a period of seconds (box 52), and re-ordered accordingly. It should be understood, however, that unlike the averaging done in box 50, where the list members can be redetermined and different members substituted, the averaging and any re-ordering done in box 52 is solely within the preferred traffic list 44. Measurements are done only on the frequency/timeslot pairings as found in the preferred traffic list 44 during the active or connection state. In order to prevent the respective pairings from jumping around in the preferred list 44, a margin is defined in that re-ordering is necessary only if the interference levels differ more than the margin, as is understood in the art.

Finally, a plurality of discrete hop lists 45 are generated from the preferred list 44 of frequency/timeslot pairings. As discussed, hop list 45 may constitute the preferred list 44 where the list contains frequencies only, as in an FDMA system. This list 44 could also be used directly in a combined FDMA/TDMA system, in which case the timeslot could be determined randomly or be based on the least interfered timeslot measured. However, in the presently preferred embodiment, in a combined FDMA/TDMA system the channels as listed in list 44 are grouped according to their timeslot designation. For example, in the three-slot FDMA/TDMA system illustrated in FIGS. 4 and 6, the three hop lists 45A, 45B and 45C are determined, each list's channels corresponding to a multiplicity of different frequencies, but associated with the same timeslot. As discussed, usage of the same timeslot but different frequencies facilitates cellular communication by avoiding complicated time jumps.

Accordingly, it should be understood that the creation of the AFA candidate list is done by long-term averaging (box 46), the creation of the DHS candidate list 42 is done by medium-term averaging (box 50), and the creation of the DHS preferred candidate or traffic list 44 is done by short-term averaging (box 52). The aforedescribed hop lists 45 are then readily generated from the traffic list 44 and grouped accordingly. The aforementioned averaging is preferably a moving-average process or an exponential-forget averaging, as discussed further hereinafter. Further, although the averaging can be done in the log domain, i.e., averaging in dBm, averaging is preferably carried out in the linear domain, i.e., averaging in mW, in order to respond quickly to increasing interference levels.

With further reference to FIG. 4, the operation of the IDLE MEAS and ACTIVE MEAS measurements will be discussed in more detail. IDLE MEAS(i,j) are a pool of measurement samples that input both to the AFA algorithm and DHS algorithm. This pool of measurements is constantly updated without regard to either algorithm. However, from this measurement pool, the AFA algorithm groups all those measurements on the same frequency, i.e., the same i, together and applies a long-term averaging (box 46) of the interference present for each of those frequencies, INT(i). The AFA algorithm then creates the aforementioned ordered list 38 from these measurements.

The IDLE MEAS(i,j) operation also inputs to the DHS algorithm, as shown in FIG. 4. Not all of the measurements are forwarded, however; only those measurements corresponding to the frequencies listed in the AFA candidate list 40. Filter 48 filters out the desired measurements from the pool of IDLE MEAS. In the DHS algorithm, first a medium-term averaging (box 50) is applied to provide the ordered DHS candidate list 42, the top elements of which constitute elements in the preferred traffic list 44, providing the DHS channels which will actually be used (each having an RXLEV below a certain threshold). More elaborate measurements are performed on this channel subset during the entire connection, creating a second pool of measurement samples, ACTIVE MEAS (i,j), which are used by the DHS algorithm to determine the preferred traffic list 44. Here, channels with the same timeslot, i.e., the same j, are grouped to provide the various different hop lists 45, which are utilized in frequency hopping in accordance with the present invention.

In other words, by the combination of a long-term AFA scheme and a short-term DHS scheme, a multiplicity of FH lists 45 are provided, each list corresponding to a particular timeslot within a conventional transmission frame. The FH list 45 having the least overall interference level is selected by the private system 24 for use, e.g., timeslot 3 or TN=3 in the example shown in FIG. 6. The private system 24, transmitting within a particular timeslot within overlapping FDMA/TDMA or FDMA system 12, will then hop from frame to succeeding frame using the frequencies defined in the chosen FH list 45, e.g., ARFCN 5 and 10 in list 45C in FIG. 6. The timeslot for the transmission is preferably kept constant. Accordingly, pursuant to frequency-hopping principles, the transmission frequency is changed throughout the signal transmission and reception by use of a number of frequencies, e.g., ARFCN 5 and 10 in the example.

It should, of course, be understood that the hop list 45 may constitute greater numbers of discrete hopping frequencies therein, e.g., three in list 45A, to take further advantage of interference and frequency diversity effects, where fading conditions are mutually uncorrelated across consecutive timeslot occurrences when the frequency of a radio connection is changed sufficiently from one TDMA frame to another. The useful effect of interference diversity is caused by the mutual uncorrelatedness of the aforedescribed hopping sequences (lists 45), i.e., by the fact that the frequency-hopping sequences of the base stations 20 using the same or nearby frequencies are mutually different, whereby connections interfering with each other change when moving from one TDMA frame to another. This contrasts with non-hopping systems where the same radio frequency and timeslot (channel) are used throughout a connection and any co-channel interference lasts as long as both the connections last because the transmissions occur more or less simultaneously on the same radio channel. By use of frequency hopping, however, the influence of strong interference sources is averaged over several channels, weakening the overall deleterious effects of said interference, as is understood in the frequency hopping art. In addition, frequency hopping in combination with frame interleaving and forward-error-correction (FEC) will provide extra protection against multipath fading, as discussed hereinbefore.

It should be understood that the aforedescribed averaging measurements are taken in the base station 20 and mobile or other terminal receiver 26 at a certain carrier frequency for a certain duration of time. The received signal strength indication (RSSI) samples are then averaged over the respective time window. Usually, the RSSI is derived from log amplifiers which give a measurement in the log domain, i.e., dBm. Accordingly, the measurement result over the respective time window provides one measurement sample: if the window is one timeslot, the measurement represents the instantaneous interference level for that slot; if the time window covers an entire TDMA frame, the measurement result represents the interference level for that carrier frequency. In any event, the measurement samples are collected and then processed accordingly. As discussed, although dBm values can be averaged, mW values (linear averaging) are preferred since this gives a faster response to increasing interference levels. The time constant for averaging in case of an exponential-forget process, or the average window in case of a moving-average process, is set depending on whether a short-term, medium-term, or long-term average is desired.

Exponential-forget averaging works as follows:

$$AVE[k] = \lambda \cdot AVE[k-1] + (1-\lambda) \cdot MEAS[k]$$

where AVE is the averaged measurement value and MEAS is the new measured value. The parameter $\lambda$ is the time constant which determines the effective average period and k is a variable. The moving-average process is:

$$AVE[k] = \sum_{i=0}^{M-1} MEAS[k-i]/M$$

where M is the number of samples to average over.

It may happen that a sudden interfering signal wipes out the entire communication between a private base station 20 and a mobile station 26. In that case, the private base 20 station is unable to transfer handover information to the mobile station 26 over the associated signaling channel. Without countermeasures, the call would be dropped due to this failure. However, the DHS scheme of the present invention preferably provides a so-called "escape link" to which both the private base station 20 and the mobile station 26, forming a connection, will jump in case link failure is experienced. This escape link can use the same hop list but another timeslot, or another hop list as well, as described. Accordingly, the escape link can, for example, be the second best hop list 45 with associated timeslot, that is, the best hop list, but one. The configuration of the escape link can, of course, change during the call due to changing interference conditions. Therefore, the escape link is preferably periodically updated by the private base station 20 and then communicated from the private base station 20 to the mobile station 26. In case a loss of connection is experienced, both the private base station 20 and the mobile station 26 may then jump to the escape link according to the last acknowledged update, and try to continue the connection there.

The previous description is of preferred embodiments for implementing the invention, and the scope of the invention should not necessarily be limited by this description. The scope of the present invention is instead defined by the following claims.

What is claimed is:

1. A method for determining candidate frequencies for minimizing interference in a communications link between a private radio system and an overlaying communications system, said method comprising the steps of:

identifying a plurality of frequencies usable by the private radio system;

performing a first plurality of measurements on each frequency of said plurality of frequencies;

averaging said first plurality of measurements for said each frequency over a first time period;

creating a first ordered list of frequencies based on said averaged first plurality of measurements, wherein said first ordered list of frequencies is arranged according to an amount of interference indicated by said averaged first plurality of measurements;

selecting a subset list from said first ordered list of frequencies, wherein said subset list contains frequencies having a lower amount of interference relative to frequencies not selected for said subset list from said first ordered list of frequencies;

averaging a second plurality of measurements for each frequency in said subset list, wherein said second plurality of measurements corresponds to a second time period smaller than said first time period;

creating a second ordered list of frequencies based on said averaged second plurality of measurements, wherein said second ordered list of frequencies is arranged according to an amount of interference indicated by said averaged second plurality of measurements;

selecting a set of optimal frequencies from said second ordered list of frequencies, wherein said set of optimal frequencies include frequencies from said second ordered list of frequencies having a lower amount of interference relative to frequencies not selected for said set of optimal frequencies from said second ordered list of frequencies; and generating a plurality of discrete hop lists from said set of optimal frequencies.

2. The method of claim 1, wherein said first time period is selected from the group consisting of a plurality of hours and a plurality of days.

3. The method of claim 1, wherein said second time period is selected from the group consisting of a period of minutes and a period of seconds.

4. The method of claim 1, wherein said step of generating a plurality of discrete hop lists further comprises the steps of:

performing active measurements on each of said optimal frequencies;

averaging said active measurements for each of said optimal frequencies over a third time period smaller than said second time period;

ordering said set of optimal frequencies into a preferred list of candidate frequencies based on said averaged active measurements; and generating said plurality of discrete hop lists from said preferred list.

5. The method of claim 1, wherein each said discrete hop list comprises:

a group of frequency/timeslot pairs, said group including a plurality of frequency/timeslot pairs each selected from said set of optimal frequencies and each having the same timeslot.

6. The method of claim 5, further comprising the step of:

selecting one of said plurality of discrete hop lists for establishing a communications link, said one of said plurality of discrete hop lists including a second plurality of frequencies having one associated timeslot.

7. The method of claim 1, wherein said step of identifying said plurality of frequencies comprises the step of:

downloading an identification of said plurality of frequencies to said private radio system from the overlaying communications system.

8. The method of claim 1, wherein said step of identifying said plurality of frequencies comprises the step of:

preprogramming said private radio system with an identification of said plurality of frequencies at a time of manufacturing.

9. The method of claim 1, wherein said step of identifying a plurality of frequencies further comprises the step of:

adapting said identified plurality of frequencies according to changes in a cellular reuse plan.

10. A method for determining candidate frequencies for minimizing interference in a communications link between a private radio system and an overlaying communications system, said method comprising the steps of:

identifying a plurality of frequencies usable by the private radio system;

performing a plurality of measurements on each frequency of said plurality of frequencies;

averaging said plurality of measurements for said each frequency over a first time period comprising a long-term duration;

creating a first ordered list of frequencies based on said averaged plurality of measurements, wherein said first ordered list of frequencies is arranged according to an amount of interference indicated by said averaged plurality of measurements;

selecting a subset list from said first ordered list of frequencies, wherein said subset list contains frequencies having a lower amount of interference relative to frequencies not selected for said subset list from said first ordered list of frequencies;

averaging a subset of measurements for each timeslot associated with each frequency in said subset list, wherein said subset of measurements corresponds to a second time period smaller than said first time period;

creating a second ordered list of frequencies and associated timeslots based on said averaged subset of measurements, wherein said second ordered list of frequencies and associated timeslots is arranged according to an amount of interference indicated by said averaged subset of measurements;

selecting a set of optimal frequency and timeslot pairings from said second ordered list of frequencies and associated timeslots, wherein said set of optimal frequency and timeslot pairings include frequencies and associated timeslots having a lower amount of interference relative to frequencies not selected for said set of optimal frequency and timeslot pairings from said second ordered list of frequencies and associated timeslots;

generating a plurality of discrete hop lists from said set of optimal frequency and timeslot pairings.

11. The method of claim 10, wherein said step of generating a plurality of discrete hop lists further comprises the steps of:

performing active measurements on each of said optimal frequency and timeslot pairings;

averaging said active measurements for each of said optimal frequency and timeslot pairings over a third time period smaller than said second time period;

ordering said set of optimal frequency and timeslot pairings into a preferred list of candidate frequencies based on said averaged active measurements; and generating a plurality of discrete hop lists from said preferred list.

12. The method of claim 10, wherein said step of generating said discrete hop lists comprises the step of:

grouping at least two of said frequency and timeslot pairings having the same timeslot into one of said plurality of discrete hop lists.

13. The method of claim 12, further comprising the step of:

selecting one of said plurality of discrete hop lists for establishing a communications link, said selected discrete hop list including a plurality of frequency and timeslot pairings having the same associated timeslot.

14. The method of claim 10, wherein said first time period is selected from the group consisting of a plurality of hours and a plurality of days.

15. The method of claim 10, wherein said second time period is selected from the group consisting of a period of minutes and a period of seconds.

16. The method of claim 10, wherein said plurality of measurements on each said frequency comprise at least one measurement on a first timeslot and at least one measurement on a second timeslot, wherein said timeslot measurements on each said frequency are averaged together to generate said averaged plurality of measurements.

17. The method of claim 10, wherein at least two timeslots from said second ordered list of frequencies and associated timeslots, each of said at least two timeslots associated with the same frequency, are measured and averaged separately of each other.

18. A method for determining candidate frequencies for minimizing interference in a communications link between a private radio system and an overlaying communications system, said method comprising the steps of:

performing measurements on a plurality of frequencies usable by the private radio system;

averaging said measurements of said plurality of frequencies, said averaged measurements indicative of an amount of interference for each of said plurality of frequencies in said private radio system;

creating an ordered list of candidate frequencies based on said averaged measurements;

generating an ordered set of frequency/timeslot pairings, each frequency of said set of frequency/timeslot pairings derived from said ordered list of candidate frequencies, each timeslot of said set of frequency/timeslot pairings associated with multiple frequencies from said ordered list of candidate frequencies, said ordered list of frequency/timeslot pairings based on an amount of interference associated with each frequency/timeslot pairing; and selecting at least one frequency/timeslot pairing from said ordered set of frequency/timeslot pairings for use in establishing a communication link, said at least one frequency/timeslot pairing selected based on the associated amount of interference.

19. The method of claim 18, further comprising, before said step of generating, the steps of:

performing second measurements on said each timeslot of said frequency/timeslot pairings; and averaging said second measurements of said each timeslot.

20. The method of claim 18, further comprising the step of:

generating a plurality discrete hop lists, each of said plurality of discrete hop lists associated with a different timeslot, each said different timeslot associated with a second plurality of frequencies.

21. The method of claim 18, further comprising the step of:

measuring a quality of said communication link to inform a private radio base station of current interference conditions.

22. The method of claim 18, wherein said step of performing measurements further comprises the steps of:

performing first measurements in the uplink; and performing second measurements in the downlink.

23. The method of claim 22, further comprising the step of:

combining said first measurement in the uplink and said second measurement in the downlink.

24. The method of claim 18, wherein said measurements on each said frequency comprise at least one measurement on a first timeslot and at least one measurement on a second timeslot, wherein said time slot measurements on each said frequency are averaged together to generate said averaged measurements.

25. The method of claim 18, wherein at least two timeslots from said ordered set of frequency/timeslot pairings, each of said at least two timeslots associated with the same frequency, are measured and averaged separately of each other.

26. A system for determining candidate frequencies for minimizing interference in a communications link in a communications system, said system comprising:

a Public Land Mobile Network; and a private radio system at least partially overlapping with the Public Land Mobile Network, said private radio system operating to:

perform measurements on a plurality of frequencies usable by the private radio system;

average said measurements of said plurality of frequencies, said averaged measurements indicative of an amount of interference for each of said plurality of frequencies in said private radio system;

create an ordered list of candidate frequencies based on said averaged measurements;

generate an ordered set of frequency/timeslot pairings, each frequency of said set of frequency/timeslot pairings derived from said ordered list of candidate frequencies, each timeslot of said set of frequency/timeslot pairings associated with multiple frequencies from said ordered list of candidate frequencies, said ordered set of frequency/timeslot pairings based on an amount of interference associated with each frequency/timeslot pairing; and select at least one frequency/timeslot pairing from said ordered set of frequency/timeslot pairings for use in establishing a communication link, said at least one frequency/timeslot pairing selected based on the associated amount of interference.

27. The system of claim 26, wherein, before operating to select at least one frequency/timeslot pairing, said private radio system further operates to:

perform second measurements on said each timeslot of said set of frequency/timeslot pairings; and average said second measurements of said each timeslot.

28. The system of claim 26, wherein said private radio system further operates to:

generate a plurality discrete hop lists, each of said plurality of discrete hop lists associated with a different timeslot, each said different timeslot associated with a second plurality of frequencies.

29. The system of claim 28, wherein said private radio system further operates to:

select one of said plurality of discrete hop lists for use in establishing said communications link.

* * * * *

UNITED STATES PATENT AND TRADEMARK OFFICE
CERTIFICATE OF CORRECTION

PATENT NO. : 6,351,643 B1
DATED : February 26, 2002
INVENTOR(S) : Haarsten

It is certified that error appears in the above-identified patent and that said Letters Patent is hereby corrected as shown below:

<u>Title page,</u>
Item [63], replace "Continuation-in-part of application No. 08/704,846, filed on Aug. 28, 1996, now Pat. No 5,884,145." with -- Continuation of app. No. 08/847,524 filed on April 24, 1997, now Pat.No. 6,009,332 which is a Continuation-in-part of application No. 08/704,846, filed on Aug. 28, 1996, now Pat. No. 5,884,145 --

<u>Column 1,</u>
Lines 7-9, replace "continuation-in-part of applicant's and assignee's U.S. patent application Ser. No. 08/704,846,846, now U.S. Pat. No 5,884,145" with -- Continuation of app. No. 08/847,524 filed on April 24, 1997, now Pat. No. 6,009,332 which is a Continuation-in-part of application No. 08/704,846, filed on Aug. 28, 1996, now Pat. No. 5,884,145 --

<u>Column 8,</u>
Line 34, replace "system.," with -- system, --

Signed and Sealed this

Eighteenth Day of February, 2003

JAMES E. ROGAN
*Director of the United States Patent and Trademark Office*